US006700704B2

(12) United States Patent
Estebe et al.

(10) Patent No.: US 6,700,704 B2
(45) Date of Patent: Mar. 2, 2004

(54) SYSTEM COMPRISING A DEVICE NECESSITATING THE RECEPTION OF LINEARLY POLARIZED BEAMS AND CORRESPONDING METHOD

(75) Inventors: Eric Estebe, Paris (FR); Eric Goutain, St Cyr S/Dourdan (FR); Dominique Mongardien, Antony (FR); Philippe Richin, Roinville sous Dourdan (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/917,924

(22) Filed: Jul. 31, 2001

(65) Prior Publication Data

US 2002/0057475 A1 May 16, 2002

(30) Foreign Application Priority Data

Aug. 1, 2000 (FR) ........................................ 00 10139

(51) Int. Cl.[7] ........................................ G02B 27/28

(52) U.S. Cl. ..................... 359/484; 359/483; 359/485; 359/900; 250/227.12

(58) Field of Search .............................. 359/140, 483, 359/485, 487, 484, 900; 250/227.12; 349/17, 196, 197; 398/53

(56) References Cited

U.S. PATENT DOCUMENTS 5,111,323 A * 5/1992 Tanaka et al. ............... 398/52
5,231,405 A 7/1993 Riza .......................... 342/375
5,319,477 A 6/1994 DeJule et al. ............... 359/140
5,345,321 A * 9/1994 DeJule et al. ................. 349/5
5,430,454 A * 7/1995 Refregier et al. ........... 342/375
5,694,233 A * 12/1997 Wu et al. .................. 359/127
5,978,125 A 11/1999 Yao ............................ 359/256
6,172,802 B1 1/2001 d'Auria et al. ............. 359/124

FOREIGN PATENT DOCUMENTS

JP 06-118455 A * 4/1994 ................ 359/485

OTHER PUBLICATIONS

L. Pastur, et al.,Applied Optics, vol. 38, No. 14, pp. 3105–3111, "Two–Dimensional Optical Architectures for the Receive Mode of Phased–Array Antennas", May 10, 1999.

N. A. Riza, et al., Applied Optics, vol. 36, No. 5, pp. 983–996, "Phased–Array Antenna, Maximum–Compression, Reversible Photonic Beam Former With Ternary Designs and Multiple Wavelengths", Feb. 10, 1997.

* cited by examiner

*Primary Examiner*—John Juba
(74) *Attorney, Agent, or Firm*—Oblon, Spivak, McClelland, Maier & Neustadt, P.C.

(57) ABSTRACT

A system including a first polarization element configured to linearly polarize at least one beam in open space, a processing device configured to receive linearly polarized beams at an input, downline from the first polarization element, a first polarization switch downline from said processing device, wherein the processing device carries out an identical processing on two states of a same input beam. The processing device includes a multiple delay creation device with polarization switches, and the multiple delay creation device includes, on two routes (j=1,2): n polarization switches $CP_i$, ($1 \leqq i \leqq n$); n polarization splitters/recombiners $SP_i^{\,j}$ ($1 \leqq i \leqq n$); and n delay devices $R_i^j$ ($1 \leqq i \leqq n$).

13 Claims, 2 Drawing Sheets

SYSTEM COMPRISING A DEVICE NECESSITATING THE RECEPTION OF LINEARLY POLARIZED BEAMS AND CORRESPONDING METHOD

BACKGROUND OF THE INVENTION

1. Field of the Invention

The invention relates to any field of application using processing that necessitates the reception of linearly polarized beams. In particular, the invention can be used in array antenna beam-shaping and aiming systems that use delay generation with polarization switching.

Unlike the generation of phase shifts between the elements of an array antenna, the generation of true delays gives an aiming direction that does not depend on the frequency.

Microwave delays can be created by optical means. The use of optics to convey microwave signals gives devices that have low dependency on the electrical frequency conveyed. These properties are especially valuable in electronic scanning antennas that have to work in a wide frequency band. Furthermore, devices using optics have reduced mass and space requirements.

2. Description of the Prior Art

Multiple devices for the creation of microwave delays by optical means are known.

The patent Thomson-CSF FR 2659754 proposes a device of this kind using polarization switches. FIG. 1 gives a schematic view of an example of this multiple device 5 for the creation of delays (hereinafter called a multiple delay-correction device) using polarization switches $CP_i$ ($1 \leqq i \leqq n$). Delays in several parallel optical paths can be commanded by means of polarization switches $CP_i$ consisting for example of matrices of pixels such as spatial light modulators, liquid crystal matrices, etc. Since the optical carriers are modulated by microwave signals, the delays will also be applied to these signals.

The association of several switches $CP_i$ consisting of pixel arrays, polarization splitter/recombiner elements $SP_i$ and reflector elements $R_i$ achieve the quantified control of the delay of each optical channel. Indeed, by controlling each pixel of a given polarization switch $Cp_i$, the delay that will be undergone by each path at the crossing of the assembly $[Sp_i, R_i]$ (direct or delayed route) is determined in binary fashion.

This concept has the advantage of providing for a multiple processing of the different spatially separated optical channels.

FIG. 2 shows a possible implementation of a multiple delay-creation device 5 using prior art polarization switches CP. This exemplary application is the supply of an antenna array working in transmission (with beam-shaping at transmission).

A modulated optical source 1 gives a beam to the coupler 2. The coupler 2 maintains the polarization and distributes the entering beams to the polarization-maintaining fibers $\mathbf{3}_M$. These beams are transmitted by the fibers $\mathbf{3}_M$ though the array of lenses $\mathbf{4}_M$ to the multiple delay-creation device 5 using polarization switches CP. The processed beams (delayed or not) at output of the multiple delay-creation device 5 are transmitted to the photodetectors 6 through the array of lenses $\mathbf{4}_V$ and the optical fibers $\mathbf{3}_V$ for which the maintaining of the polarization is not necessary. The array of lenses $\mathbf{4}_M$ and $\mathbf{4}_V$ provide for accurate coupling between the fibers $\mathbf{3}_M$ and $\mathbf{3}_V$ respectively and the multiple delay-creation device 5. Each photodetector 6 is connected to an antenna element or sub-array 7.

In order that the selection of a delay by polarization switching may be efficient, the polarization switch must receive a linearly polarized beam. This is why the implementation of the multiple delay-creation device 5 with polarization switches $CP_i$ described in the patent FR 2659754 requires polarization-maintaining elements 2 and $\mathbf{3}_M$ upline from the multiple delay-creation device 5. This constraint is not negligible because these polarization-maintaining elements, couplers 2 for example, of the fibers $\mathbf{3}_M$ are more costly and more difficult to implement than elements that do not maintain polarization.

The present invention is used to overcome or at least reduce these drawbacks by proposing an alternative solution.

SUMMARY THE INVENTION

It proposes a system comprising a processing device that necessitates the reception of linearly polarized beams at input wherein it furthermore comprises at least one element for polarization splitting in open space, placed upline from said device.

This system may comprise for example:

- a polarization switch downline from said device, and
- an element for superposing polarization in open space downline from the polarization switch.

The invention furthermore proposes a method comprising a step for the processing of linearly polarized beams, the method comprising at least the splitting of polarizations in open space achieved prior to said processing step.

This method for example comprises the following steps:

- an additional polarization switching achieved after said processing step, and
- the superposing of polarization in open space achieved after said additional switching step.

BRIEF DESCRIPTION OF THE DRAWINGS

The characteristics and advantages of the invention shall appear more clearly from the following description given by way of an example and the appended figures, of which.

MORE DETAILED DESCRIPTION

Figure 3:
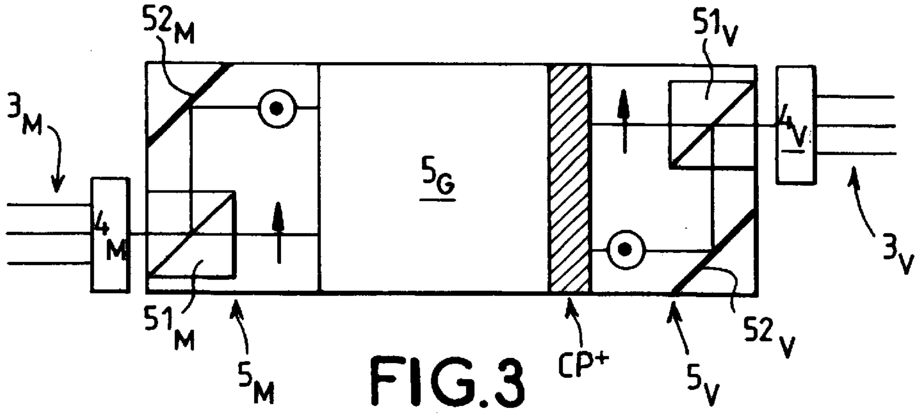
FIG. 3 shows a system implementing a processing method $\mathbf{5}_G$ necessitating the reception of linearly polarized beams according to the invention, FIGS. 4(*a*) and 4(*b*) show the system of FIG. 3 implementing a multiple delay-creation device $\mathbf{5}_G$ comprising respectively two identical multiple delay-creation devices such as the one of FIG. 1 and a multiple delay-creation device common to both routes, according to the invention.

FIG. 3 proposes an example according to the invention of a system implementing a processing device $\mathbf{5}_G$ that necessitates upline maintaining of polarization.

In the present example, the initial optical beams are transmitted by means of optical fibers $\mathbf{3}_M$, that do not necessitate polarization maintaining, and an array of lenses $\mathbf{4}_M$ to an element for the splitting polarization in open space $5_M$. This splitter element $5_M$, comprising for example a polarization splitter $51_M$ and a mirror $52_M$, is placed upline with respect to the device $5_G$, to which it delivers a group of polarization beams $\uparrow$ and a group of orthogonal polarization beams $\odot$ (the symbols $\uparrow$ and $\odot$ indicate the orientation of the polarization). The two groups of beams entering the device $5_G$ are therefore linearly polarized as required by the processing operations contained in this device $5_G$. The device $5_G$ may for example be a multiple delay-creation device 5 with polarization switches $CP_i$ such as the one shown in FIG. 1. The splitter element $5_M$ generates the doubling of the number of pixels of the multiple delay-creation device 5 as compared with the solution using polarization maintaining elements (fibers, etc.).

The two polarization states coming from a given initial beam undergo the same processing by the device $5_G$. For example, the multiple delay-creation device 5 applies identical delays to the two orthogonal polarization beams coming from an initial beam. Each group of beams processed at output of the device $5_G$ goes through a polarization switch $CP^+$ used to determine the polarization of each of the groups at its output.

The additional switch $CP^+$ may for example have either 2N pixels or two switches $CP^{1+}$ and $CP^{2+}$ with N pixels (not shown in the figures), one for each of the two groups of beams.

Figure 1:
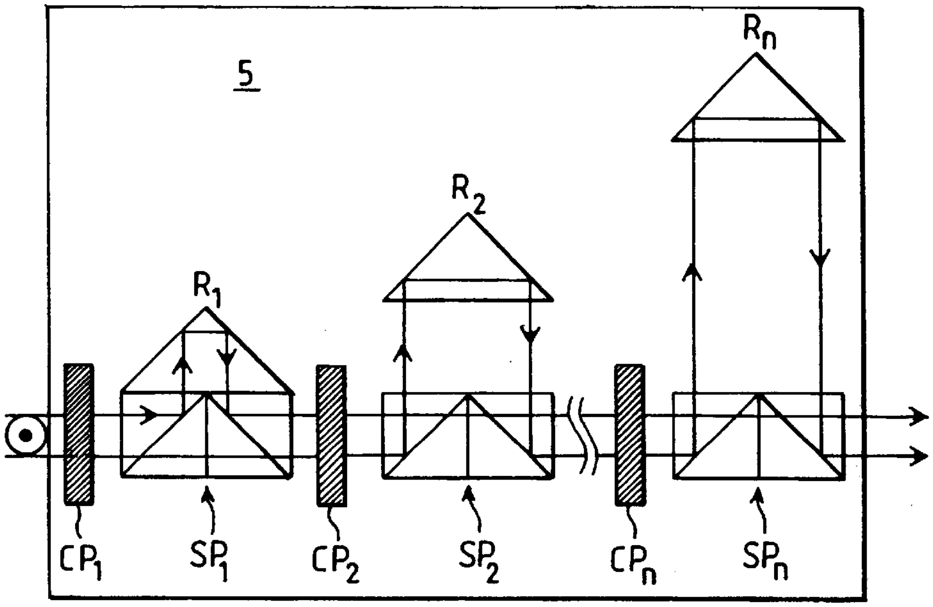
FIG. 1 BACKGROUND ART
FIG. 1 shows an example of a multiple delay-creation device 5 using prior art polarization switches $CP_i$, FIG. 2 exemplifies the implementation of a multiple delay-creation device 5 using prior art polarization switches $CP_i$.
Figure 2:
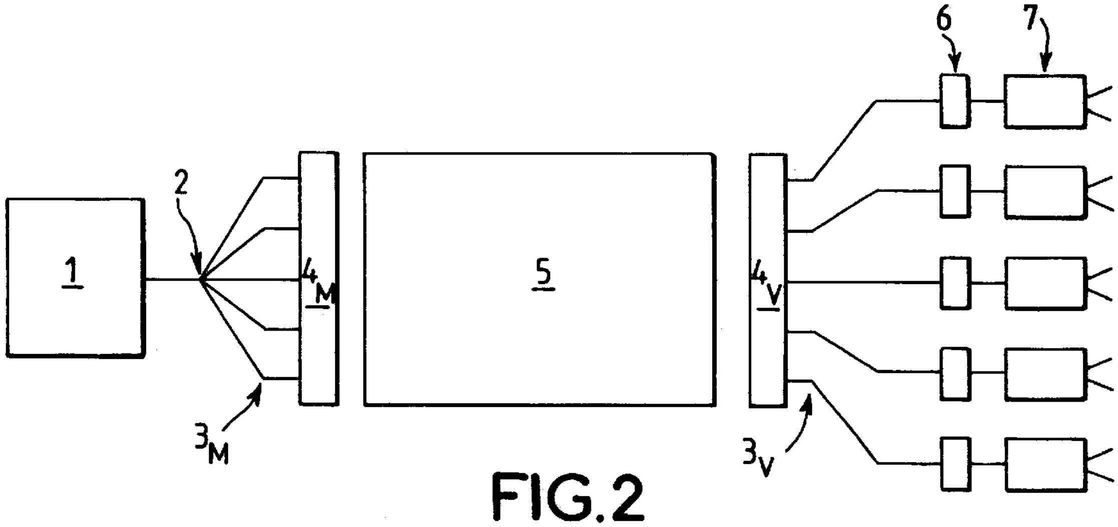
FIG. 2 BACKGROUND ART

The role of the polarization switch $CP^+$ is twofold and differs from the role of the polarization switches $CP_i$ of the multiple delay-creation device 5 of FIG. 1 responsible for selecting the direct or delayed route that must be followed by a given initial beam. Indeed, the switch $CP^+$ ensures that, 1) all the beams of a group whose polarization was respectively $\uparrow$ and $\odot$ before processing by the device $5_G$ are in a same polarization at output of $CP^+$, and that
2) the polarization of the first group of beams is orthogonal to the polarization of the second group of beams.

This makes it possible, first of all, to reorganize the polarization of the beams of the two groups which are modified by the use of the different polarization switches $CP_i$ of the multiple delay-creation device $5_G$. Furthermore, this enables the polarizing of the two groups of beams according to the position of the polarization superimposing element $51_V$ with respect to the polarization switch CP+ such that the two groups of beams at output of the device $5_G$ are recombined by the polarization superposing element $51_V$.

The initial beams may then be reconstituted by means of the open space superposing element $5_V$. This open space superposing element $5_V$ placed after the polarization switch $CP^+$ superposes signals coming from the previously split polarizations, for example by means of a device using a mirror $52_V$ and a polarization splitter mirror $51_V$ (herein playing the role of a recombiner). The post-processing superposition of the two polarization states coming from a given initial beam therefore mitigates the fluctuations in levels that may exist between either of the polarization states. The beams thus processed are sent to a user circuit, for example through the network of lenses $4_V$ and the fibers $3_V$ not requiring polarization maintenance.

In one possible variant of the system the fibers $3_M$ and $3_V$ and the lenses $4_M$ and $4_V$ are replaced by system for the propagation of the beams in open space.

Furthermore, the polarization splitters $51_M$ and $51_V$ may for example be polarization splitting cubes but it is also possible to consider using other elements such as, for example, spatial splitters using birefringent materials and prompting a beam deflection depending on the polarization.

Inasmuch as the doubling of the number of pixels remains compatible with the technology for making the multiple device for the creation of delays in open space, the solution proposed here above simplifies the implementation of the system by eliminating the need to maintain the polarization before the feeding of the multiple delay-creation system 5.

It may be noted that, because of its structure, the proposed system comprising a multiple delay-creation system S with polarization switches $CP_i$ is reciprocal (i.e. a two-way system). It therefore enables the creation of microwave delays by optical means for beam shaping and aiming in array antennas working in transmission or reception especially in the case of electronic scanning antennas that have to work in a wide band.

As specified here above, the device $5_G$ is not necessarily a multiple delay-creation device 5 with polarization switching but may be any type of device requiring linearly polarized beams at input.

Figure 4A:
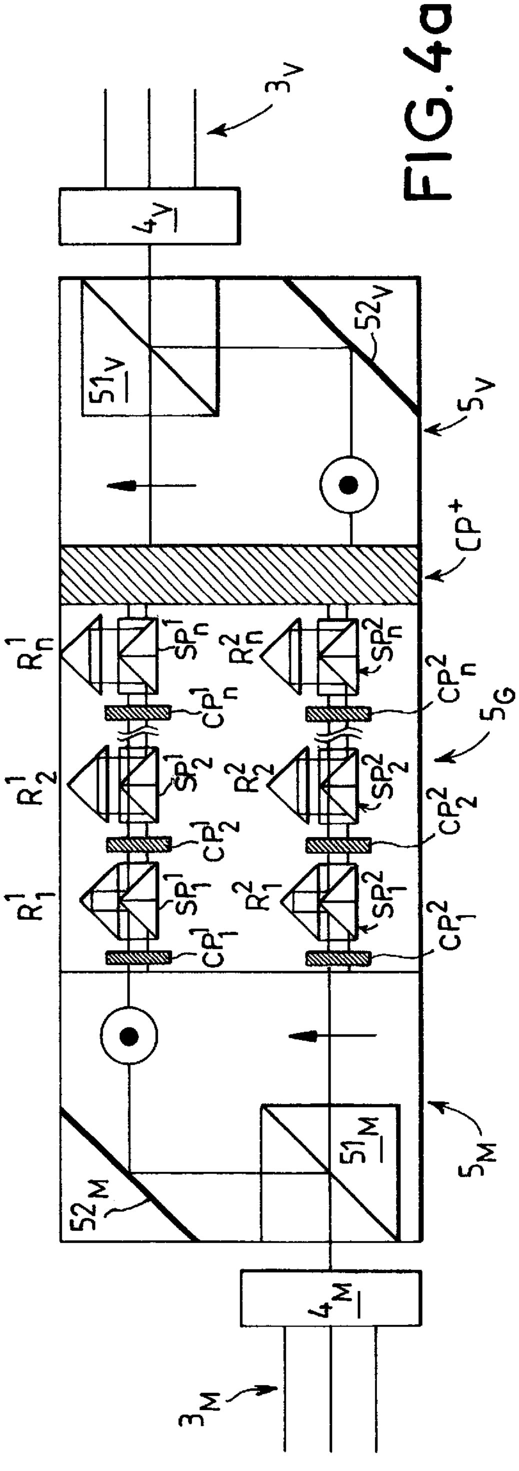
Figure 4B:
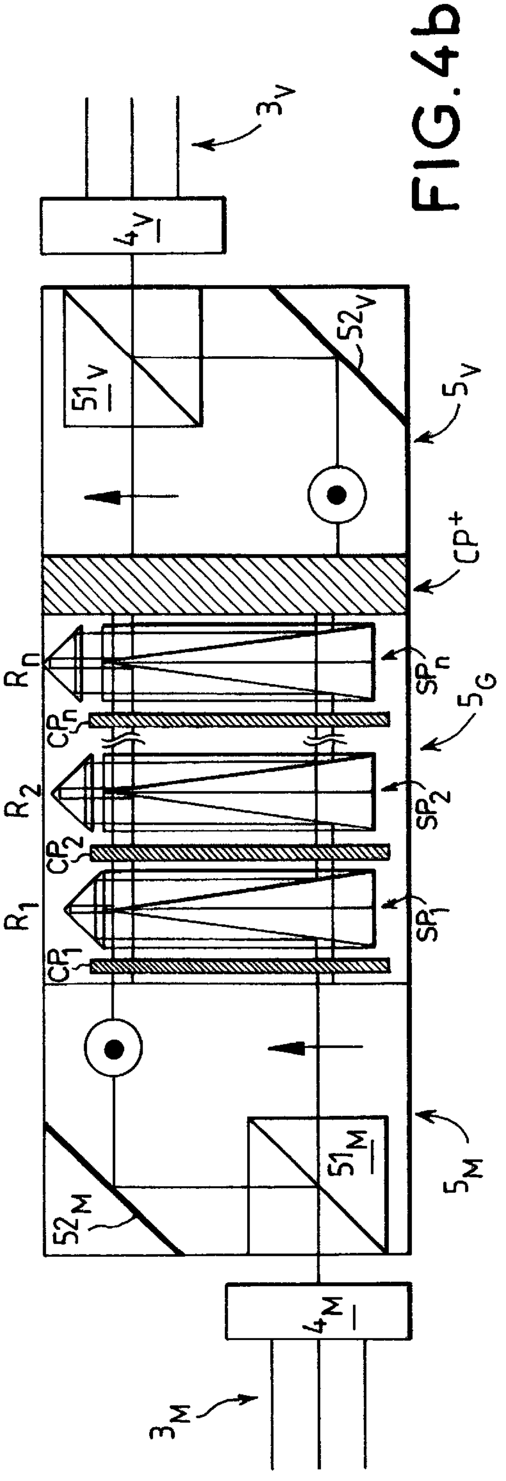

FIGS. 4(*a*) and 4(*b*) show two versions of the system according to FIG. 3 when the processing device $5_G$ is a multiple delay-creation device.

The first version of the system shown in FIG. 4(*b*) is such that the multiple delay-creation device $5_G$ comprises, for each group of orthogonal or almost orthogonal polarization beams, a multiple delay-creation device such as the multiple delay-creation device 5 of FIG. 1. It has for example:

n polarization splitters/recombiners $SP_i$ ($1 \leqq i \leqq n$), each polarization splitter/recombiner $SP_i$ separating and then recombining the two beams switched by the upline polarization switch $CP_i$ with the other non-switched beams, n delay devices $R_i$ ($1 \leqq i \leqq n$) each delay device $R_i$ delaying the two beams split by the polarization splitter/recombiner $SP_i$ by a same delay $\tau_i$ ($1 \leqq i \leqq n$) before their recombination by the polarization splitter/recombiner $SP_i$.

The second version of the system presented by FIG. 4(*a*) is such that the multiple delay-creation device $5_G$ has a structure similar to that of the multiple delay-creation device 5 of FIG. 1. It comprises at least, on each of the two paths (j=1,2):

n polarization switches $CP_i^j$ ($1 \leqq i \leqq n$ and j=1,2), the polarization switch) $CP_i^j$ of the first path and the polarization switch $CP_i^2$ of the second path each, in a similar way, switching a beam corresponding to one of the two polarization states of an initial beam entering said system, n polarization splitters/recombiners $SP_i^j$ ($1 \leqq i \leqq n$ and j=1, 2), the polarization splitter/recombiner $SP_i^j$ separating and then recombining the beam switched by the upline polarization switch $CP_i^j$ with the other beams, n delay devices $R_i^j$ ($1 \leqq i \leqq n$ and j=1,2), the delay device $R_i^1$ and the delay device $R_i^2$ respectively delaying the beam separated by the polarization splitter/recombiner $SP_i^1$ and the beam separated by the polarization splitter/recombiner $SP_i^2$ by a same delay $\tau_i$ ($1 \leqq i \leqq n$) before their recombination by, respectively, the polarization splitter/recombiner $SP_i^1$ and the polarization splitter/recombiner $SP_i^2$.

The splitters/recombiners $SP_1$, $SP_2$, . . . , $SP_n$ are represented in FIG. 4(*b*) in proportions such that they facilitate the reading of FIG. 4(*b*) without being exhaustive. The proportions of the splitters/recombiners $SP_1$, $SP_2$, . . . , $SP_n$ of FIG. 4(*b*) may for example be similar to those of the splitters/recombiners $SP^1{}_1$, $SP^1{}_2$ . . . $SP^1{}_n$ and $SP^2{}_1$, $SP^2{}_2$ . . . $SP^2{}_n$ of FIG. 4(*a*).

The multiple delay-creation device $5_G$ is capable of delaying 2N beams, namely twice the number of the beams delayed by the multiple delay-creation device 5 of FIG. 1. For this purpose, the matrices of the polarization switches $CP_1, CP_2, \ldots, CP_n$ used by the multiple delay-creation device $5_G$ have 2N pixels. The delays induced by the multiple delay-creation device $5_G$ for the two groups of beams are such that two groups of orthogonal polarization beams coming from an initial beam entering the system shown in FIGS. 4(*a*) and 4(*b*) undergo the same delay $\tau_1, \tau_2 \ldots \tau_n$ created by the delay devices of the first path $R_1^1, R_2^1 \ldots R_n^1$ and the second path $R_1^2, R_2^2 \ldots R_n^2$ in the case of FIG. 4(*a*) or the delay devices $R_1, R_2, \ldots, R_n$ in the case of FIG. 4(*b*).

The matrices of the polarization switches of the first path $CP_1^1, CP_2^1 \ldots CP_n^1$ and of the second path $CP_1^2, CP_2^2 \ldots CP_n^2$ may for example be identical ($CP_1^1=CP_1^2, CP_2^1=CP_2^2 \ldots CP_n^1=CP_n^2$), as in FIG. 4(*a*). Or again the N first pixels $CP_1^1, CP_2^1 \ldots CP_n^1$ of the matrices of the polarization switches $CP_1, CP_2, \ldots, CP_n$ may for example be identical to the last N pixel $CP_1^2, CP_2^2 \ldots CP_n^2$ of the matrices of the polarization switches $CP_1, CP_2, \ldots, CP_n$ ($CP_1^1=CP_1^2, CP_2^1=CP_2^2 \ldots CP_n^1=CP_n^2$) as in the case of FIG. 4(*b*).

Let us follow an initial beam F which has to be delayed, for example by a duration $\tau_2+\tau_5$. This beam F is separated by the polarization splitter $\mathbf{51}_M$, according to two orthogonal or almost orthogonal polarization states, into two beams $F^1$ and $F^2$. The polarization switches $CP_2^1$ and $CP_2^2$ of FIG. 4(*a*) or the polarization switches $CP_2$ of FIG. 4(*b*) change the polarization state of the beams $F^1$ and $F^2$ such that respectively the polarization splitters $SP_2^1$ and $SP_2^2$ of FIG. 4(*a*) or the polarization splitter $SP_2$ of FIG. 4(*b*) modify the route of these two beams $F^1$ and $F^2$ with respect to all the beams. The beams $F^1$ and $F^2$ are then delayed by a duration $\tau_2$ either by the delay devices $R_2^1$ and $R_2^2$ of FIG. 4(*a*) or the delay device $R_2$ of FIG. 4(*b*). The polarization splitters $SP_2^1$ and $SP_2^2$ of FIG. 4(*a*) or the polarization splitter $SP_2$ of FIG. 4(*b*) then recombine the delayed beams $F^1$ and $F^2$ with all the beams that have followed a direct route between the input of the polarization switches $CP_2^1$ and $CP_2^2$ of FIG. 4(*a*) or of the polarization switch $CP_2$ of FIG. 4(*b*) and the output of the polarization splitters $SP_2^1$ and $SP_2^2$ of FIG. 4(*a*) or of the polarization splitter $SP_2$ of FIG. 4(*b*). The delay $\tau_5$ is applied in the same way. The polarization switch $CP^+$ places the beam $F^1$ in a given polarization state identical for all the beams having followed the first route and the beam $F^2$ in a given polarization state identical for the all the beams having followed the second route. The polarization state of the beam $F^2$ is orthogonal or almost orthogonal to the state of the beam $F^1$. One of the beams $F^1$ or $F^2$ directly reaches one of the inputs of the polarization superposing element $\mathbf{51}_V$, and the other beam $F^2$ or $F^1$ is redirected by a mirror $\mathbf{52}_V$ to the second input of the superposing element $\mathbf{51}_V$ which then superposes the two delayed beams $F^1$ and $F^2$ so as to obtain the delayed beam F.

The multiple delay-creation device serving as a basis for the creation of the multiple delay-creation device $5_G$ may also be any multiple delay-creation device other than the one presented in FIG. 1 such as for example those presented in the patent FR 2659754.

One variant of the system comprising a patent device requiring the reception of linearly polarized beams at input such as for example a multiple delay-creation device $5_G$ may comprise only the element $\mathbf{51}_M$ upline from said collective delay-creation device $5_G$. A system of this kind doubles the number of delays.

What is claimed is:

1. A system comprising:

a first polarization splitting element configured to split at least one beam and to linearly polarize each part of the at least one beam in open space;

a processing device configured to receive linearly polarized beams at an input, downline from said first polarization splitting element, and said processing device includes, on two routes:

n polarization switches $CP_i$, ($1 \leqq i \leqq n$), n polarization splitters/recombiners $SP_i$ ($1 \leqq i \leqq n$), and n delay devices $R_i$ ($1 \leqq i \leqq n$); and a first polarization switch downline from said processing device, wherein the at least one beam is arbitrarily polarized, wherein said processing device carries out time delay processing on two states of a same input beam such that said two states of said input beam do not recombine in said processing device, and wherein each of said n polarization switches, n polarization splitters/recombiners, and n delay devices of said processing device is placed on both of said two routes.

2. The system according to claim 1, wherein said first polarization splitting element splits and linearly polarizes the at least one beam into two routes corresponding to two polarization states, orthogonal or almost orthogonal.

3. The system according to claim 1, further comprising a superposing element configured to superpose said linearly polarized parts of the at least one beam downline from said first polarization switch.

4. The system according to claim 3, wherein said first polarization splitting element splits and linearly polarizes the at least one beam into two routes corresponding to two polarization states, orthogonal or almost orthogonal.

5. The system according to claim 4, wherein said superposing element recombines beams for which the two polarization states have been conformed by said first polarization switch.

6. The system according to claim 3, wherein said first polarization switch is configured to conform an output polarization direction of beams processed, at an output of said processing device, to an input polarization direction produced by said first polarization splitting element and enable recombination of the processed beams by said superposing element.

7. The system according to claim 3, further comprising:

plural first fibers and a first array of lenses, said first array of lenses enabling coupling of said plural first fibers to an input of said first polarization splitting element;

plural second fibers and a second array of lenses, said second array of lenses coupling an output of said superposing element to said plural second fibers;

a mirror on one of the two routes corresponding to said two polarization states; and said superposing element comprising at least one mirror on one route followed by a polarization recombiner element receiving the two routes.

8. A method, comprising:

splitting and linearly polarizing at least one arbitrarily polarized beam in open space;

time delay processing linearly polarized beams on two routes; and switching polarization of said linearly polarized beams, wherein said processing step comprises processing two states of a same input beam such that said two states of said input beam do not recombine during said processing step, and using a multiple delay creation device including n polarization switches, n polarization splitters/recombiners, and n delay devices, each of said n polarization switches n polarization splitters/recombiners, and n delay devices are arranged on both of said two routes.

9. The method according to claim 8, further comprising superposing polarization of the two states of said same input beam.

10. The method according to claim 9, wherein the superposing polarization superposes processed beams during the switching.

11. The method according to claim 8, wherein the splitting and linearly polarizing comprises separating the at least one beam according to two polarization states, orthogonal or almost orthogonal.

12. The method of claim 11, wherein the polarization switching conforms an output polarization direction of the at least one arbitrarily polarized beam to an input direction produced by said splitting and linearly polarizing and recombines the two polarization states to a single beam.

13. The method according to claim 8, wherein the processing includes performing similar processing on two polarization states of the same input beam.

* * * * *